United States Patent
Tejima (10) Patent No.: US 11,902,489 B2
(45) Date of Patent: Feb. 13, 2024

(54) DRAWING SYSTEM AND METHOD OF CREATING CONVERSION PROFILE

(71) Applicant: Sony Corporation, Tokyo (JP)

(72) Inventor: Asuka Tejima, Tokyo (JP)

(73) Assignee: SONY CORPORATION, Tokyo (JP)

( * ) Notice: Subject to any disclaimer, the term of this patent is extended or adjusted under 35 U.S.C. 154(b) by 437 days.

(21) Appl. No.: 17/264,698

(22) PCT Filed: Aug. 20, 2019

(86) PCT No.: PCT/JP2019/032400
§ 371 (c)(1),
(2) Date: Jan. 29, 2021

(87) PCT Pub. No.: WO2020/054330
PCT Pub. Date: Mar. 19, 2020

(65) Prior Publication Data
US 2021/0314463 A1     Oct. 7, 2021

(30) Foreign Application Priority Data

Sep. 14, 2018   (JP) ................................. 2018-172663

(51) Int. Cl.
*H04N 1/60*     (2006.01)
*B41J 2/44*     (2006.01)
(Continued)

(52) U.S. Cl.
CPC ............... *H04N 1/60* (2013.01); *B41J 2/442* (2013.01); *B41J 2/4753* (2013.01); *B41M 5/284* (2013.01); *B41M 5/305* (2013.01); *B41M 5/323* (2013.01)

(58) Field of Classification Search
CPC ........... H04N 1/60; B41J 2/442; B41J 2/4753; B41M 5/284; B41M 5/305; B41M 5/323
See application file for complete search history.

(56) References Cited

U.S. PATENT DOCUMENTS 5,638,109 A * 6/1997 Agano ............... G06K 15/1223
                                                                347/251
5,909,232 A   6/1999 Yasuhiko et al.
(Continued)

FOREIGN PATENT DOCUMENTS

EP    2492103 A1    8/2012
JP    H06-198925 A   7/1994
(Continued)

OTHER PUBLICATIONS

International Search Report issued in International Patent Application No. PCT/JP2019/032400 dated Oct. 21, 2019 and English translation of same. 5 pages.
(Continued)

*Primary Examiner* — Justin Seo
*Assistant Examiner* — Kendrick X Liu
(74) *Attorney, Agent, or Firm* — K&L Gates LLP (57) ABSTRACT

A drawing system according to an embodiment of the present disclosure includes a storage, a generator, and a drawing section. The storage stores a conversion table that describes a correspondence relationship between gradation values in a leuco color space and output setting values of light sources. The generator generates, on the basis of leuco image data described in the leuco color space and the conversion table, the output setting values corresponding to the leuco image data. The drawing section performs drawing on a recording medium on the basis of the output setting values generated by the generator, the recording medium including a plurality of recording layers, the plurality of recording layers each including a leuco dye and a photothermal conversion agent.

8 Claims, 5 Drawing Sheets

(51) Int. Cl.
    *B41J 2/475*    (2006.01)
    *B41M 5/28*     (2006.01)
    *B41M 5/30*     (2006.01)
    *B41M 5/323*    (2006.01)

(56) References Cited

U.S. PATENT DOCUMENTS

| | | |
|---|---|---|
| 6,995,116 B2 | 2/2006 | Tsuboi et al. |
| 2001/0012045 A1* | 8/2001 | Goto ........................ B41M 5/30 |
| | | 347/187 |
| 2006/0276335 A1* | 12/2006 | Tsuboi .................... B41M 5/34 |
| | | 427/127 |
| 2008/0015107 A1 | 1/2008 | Elmasry et al. |
| 2008/0192618 A1* | 8/2008 | Nakata ................... B41J 2/4753 |
| | | 369/120 |
| 2009/0203521 A1 | 8/2009 | Ishimi |
| 2012/0157303 A1* | 6/2012 | Aosaki ................. B41M 5/3335 |
| | | 503/225 |
| 2014/0085682 A1 | 3/2014 | Ukishima |

FOREIGN PATENT DOCUMENTS

| | | |
|---|---|---|
| JP | 2004-074584 A | 3/2004 |
| JP | 2014-068197 A | 4/2014 |
| WO | WO2008/008509 A2 | 1/2008 |
| WO | WO2018/123340 A1 | 7/2018 |

OTHER PUBLICATIONS

Written Opinion issued in International Patent Application No. PCT/JP2019/032400 dated Oct. 21, 2019. 5 pages.

* cited by examiner

RECORDING LAYERS 113 EACH INCLUDE 100A AND 100B

DRAWING SYSTEM AND METHOD OF CREATING CONVERSION PROFILE

TECHNICAL FIELD

The present disclosure relates to a drawing system and a method of creating a conversion profile.

BACKGROUND ART

A heat-sensitive recording medium including a leuco dye, which is one of heat-sensitive color developing compositions, has been in widespread use (for example, see PTL 1). Examples of such a recording medium which has currently been practically used include an irreversible recording medium which is not able to be erased after being written once and a reversible recording medium which is able to be rewritten many times.

CITATION LIST

Patent Literature

PTL 1: Japanese Unexamined Patent Application Publication No. 2004-74584

SUMMARY OF THE INVENTION

However, there has been an issue that it is difficult to achieve faithful color reproduction in drawing on a heat-sensitive recording medium including a leuco dye. Accordingly, it is desirable to provide a drawing system and a method of manufacturing a conversion profile that are able to achieve faithful color reproduction on a heat-sensitive recording medium including a leuco dye.

A drawing system according to an embodiment of the present disclosure includes a storage, a generator, and a drawing section. The storage stores a conversion table that describes a correspondence relationship between gradation values in a leuco color space and output setting values of light sources. The generator generates, on the basis of leuco image data described in the leuco color space and the conversion table, the output setting values corresponding to the leuco image data. The drawing section performs drawing on a recording medium on the basis of the output setting values generated by the generator, the recording medium including a plurality of recording layers, the plurality of recording layers each including a leuco dye and a photothermal conversion agent.

In the drawing system according to an embodiment of the present disclosure, the output setting values corresponding to the leuco image data is generated on the basis of the leuco image data described in the leuco color space and the conversion table. The conversion table describes the relationship between the gradation values in the leuco color space and the output setting values. This enables to obtain output setting values suitable for drawing the leuco image data.

A method of creating a conversion profile according to an embodiment of the present disclosure include the following two steps.
- (A) Generating a color list on the basis of a conversion table that describes a correspondence relationship between gradation values in a leuco color space and output setting values of light sources, the color list describing combinations of gradation values of respective colors in the leuco color space and the output setting values corresponding to the combinations
- (B) Generating a conversion profile that describes a correspondence relationship between values in a device-independent color space and the gradation values in the leuco color space, the values in the device-independent color space being obtained by performing color measurement on a recording medium on which drawing has been performed on the basis of the color list, the recording medium including a plurality of recording layers, the plurality of recording layers each including a leuco dye and a photothermal conversion agent In the method of creating the conversion profile according to an embodiment of the present disclosure, the color list is generated on the basis of the conversion table that describes the correspondence relationship between the gradation values in the leuco color space and the output setting values of light sources, the color list describing the combinations of the gradation values of respective colors in the leuco color space and the output setting values corresponding to the combinations. Thereafter, the conversion profile is generated that describes the correspondence relationship between the values in the device-independent color space and the gradation values in the leuco color space, the values in the device-independent color space being obtained by performing color measurement on the recording medium on which drawing has been performed on the basis of the color list. This enables to obtain output setting values suitable for drawing the leuco image data by using the color list and the conversion profile.

MODES FOR CARRYING OUT THE INVENTION

In the following, some embodiments of the present disclosure are described in detail with reference to the drawings. The following description is one specific example of the present disclosure, and the present disclosure is not limited thereto.

1. First Embodiment

[Configuration]

Figure 1:
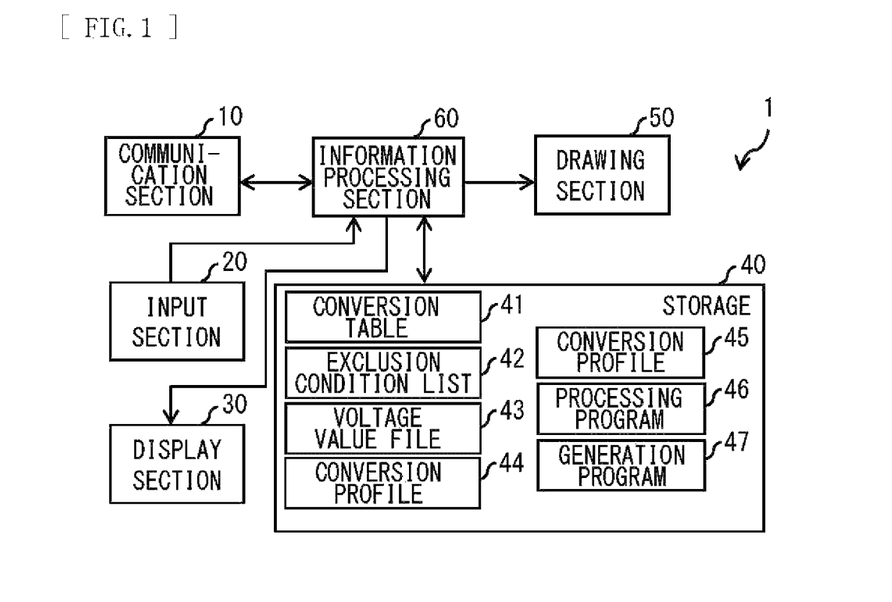
FIG. 1 is a diagram illustrating an exemplary schematic configuration of a drawing system according to a first embodiment of the present disclosure.

A drawing system 1 according to a first embodiment of the present disclosure will be described. FIG. 1 illustrates an exemplary schematic configuration of the drawing system 1 according to the present embodiment. The drawing system 1 writes (draws) information on a recording medium 100 to be described later. Specifically, the drawing system 1 converts externally inputted image data described in a device-dependent color space (hereinafter, referred to as "input image data") into image data described in a leuco color space (hereinafter, referred to as "leuco image data"). Here, the device-dependent color space is an RGB color space such as sRGB or adobe (registered trademark) RGB, for example. The leuco color space is a color space which the recording medium 100 has as characteristics. The drawing system 1 further converts the leuco image data obtained by the conversion into output setting values of a drawing section 50 to be described later and inputs the output setting values obtained by the conversion to the drawing section 50 to thereby perform drawing on the recording medium 100. In this manner, the drawing system 1 includes a color management system suitable for the recording medium 100. In the following, first, the recording medium 100 will be described, and then the drawing system 1 will be described.

(Recording Medium 100)

Figure 2:
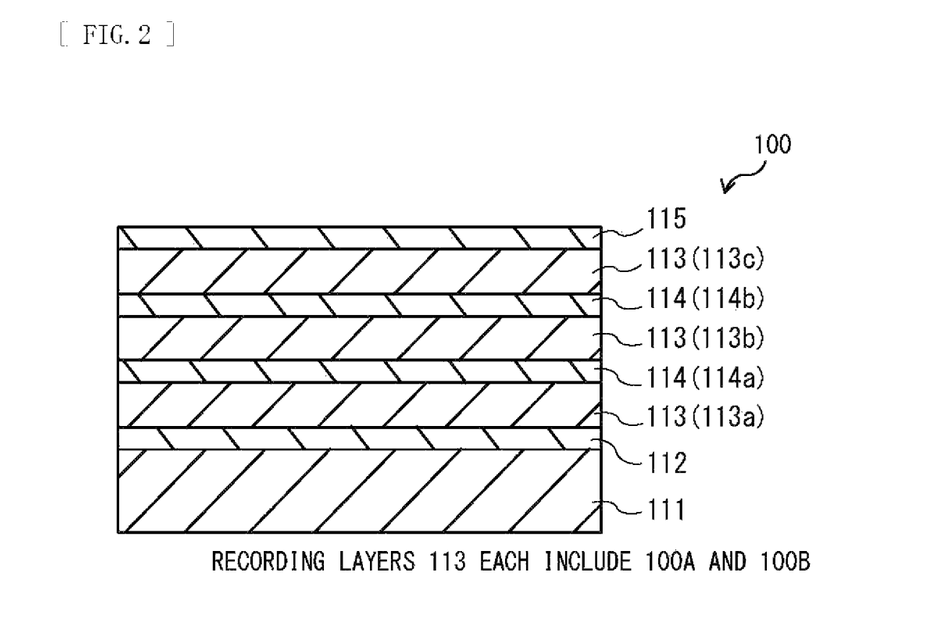
FIG. 2 is a diagram illustrating an exemplary cross-sectional configuration of a recording medium.

FIG. 2 illustrates an exemplary configuration of each layer included in the recording medium 100. The recording medium 100 includes a plurality of recording layers 133 having different developed color tones from each other. The recording medium 100 has, for example, a structure in which the recording layers 113 and heat-insulating layers 114 are alternately stacked over a base material 111.

The recording medium 100 includes, for example, a base layer 112, three recording layers 113 (113a, 113b, and 113c), two heat-insulating layers 114 (114a and 114b), and a protective layer 115 over the base material 111. The three recording layers 13 (113a, 113b, and 113c) are disposed in the order of the recording layer 113a, the recording layer 113b, and the recording layer 113c, from a side of the base material 111. The two heat-insulating layers 114 (114a and 114b) are disposed in the order of the heat-insulating layer 114a and the heat-insulating layer 114b, from the side of the base material 111. The base layer 112 is formed in contact with the base material 111. The protective layer 115 is formed on an outermost surface of the recording medium 100.

The base material 111 supports each recording layer 113 and each heat-insulating layer 114. The base material 111 functions as a substrate whose surface over which each layer is to be formed. The base material 111 may transmit light or may not transmit light. In a case where light is not transmitted, a color of the surface of the base material 111 may be, for example, white or a color other than white. The base material 111 includes, for example, an ABS-resin. The base layer 112 has a function of improving adhesion between the recording layer 113a and the base material 111. The base layer 112 includes, for example, a material that transmits light. It is to be noted that a moisture-resistant barrier layer or a light-resistant barrier layer may be provided above or below the base layer 112 or the base material 111. In addition, the heat-insulating layer 114 may be provided between the base layer 112 and the recording layer 113a.

The three recording layers 113 (113a, 113b, and 113c) are able to reversibly change states between a color-developed state and a decolored state. The three recording layers 113 (113a, 113b, and 113c) are configured so that the colors in the color-developed states are different from each other. Each of the three recording layers 113 (113a, 113b, and 113c) includes a leuco dye 100A (reversible heat-sensitive color developing composition) and a photothermal conversion agent 100B (photothermal conversion agent) that generates heat upon writing. Each of the three recording layers 13 (113a, 113b, and 113c) further includes a developer and a polymer.

The leuco dye 100A is combined with the developer by heat to turn into the color-developed state or separated from the developer to turn into the decolored state. The developed color tone of the leuco dye 100A included in each recording layer 113 (113a, 113b, and 113c) is different for each recording layer 113. The leuco dye 100A included in the recording layer 113a is combined with the developer by heat to develop a magenta color. The leuco dye 100A included in the recording layer 113b is combined with the developer by heat to develop a cyan color. The leuco dye 100A included in the recording layer 113c is combined with the developer by heat to develop a yellow color. The positional relationship among the three recording layers 113 (113a, 113b, and 113c) is not limited to the above examples. The three recording layers 113 (113a, 113b, and 113c) are transparent in the decolored state. Thus, the recording medium 100 is able to record an image using colors of a wide color gamut.

The photothermal conversion agent 100B absorbs light in the near-infrared region (700 nm to 2500 nm) and generates heat. It is to be noted that in this specification, the near-infrared region refers to a wavelength band of 700 nm to 2500 nm. Absorption wavelengths of the photothermal conversion agents 100B included in the respective recording layers 113 (113a, 113b, and 113c) are different from each other within the near-infrared region (700 nm to 2500 nm). The photothermal conversion agent 100B included in the recording layer 113c has, for example, an absorbance peak at 760 nm. The photothermal conversion agent 110B including in the recording layer 113b has, for example, an absorbance peak at 860 nm. The photothermal conversion agent 100B included in the recording layer 113a has, for example, an absorbance peak at 915 nm. The absorption peak of the photothermal conversion agent 100B included in each of the recording layers 113 (113a, 113b, and 113c) is not limited to the above examples.

The heat-insulating layer 114a makes it difficult for heat to transfer between the recording layer 113a and the recording layer 113b. The heat-insulating layer 114b makes it difficult for heat to transfer between the recording layer 113b and the recording layer 113c. The protective layer 115 protects the surface of the recording medium 100 and functions as an overcoat layer of the recording medium 100. The two heat-insulating layers 114 (114a and 114b) and the protective layer 115 each include a transparent material. The recording medium 100 may include, for example, a relatively rigid resin layer (e.g., a PEN resin layer) immediately below the protective layer 115. The protective layer 115 may include a moisture-resistant barrier layer or a light-resistant barrier layer. Also, the protective layer 115 may include any functional layer.

(Drawing System 1)

Next, the drawing system 1 according to the present embodiment will be described.

The drawing system 1 includes a communication section 10, an input section 20, a display section 30, a storage 40, the drawing section 50, and an information processing section 60. The drawing system 1 is coupled to a network via the communication section 10. The network is, for example, a communication line such as LAN or WAN. A terminal device is coupled to the network. The drawing system 1 is configured to be able to communicate with the terminal device via the network. The terminal device is, for example, a mobile terminal, and is configured to be able to communicate with the drawing system 1 via the network.

The communication section 10 communicates with an external device such as the terminal device. The communication section 10 transfers input image data $I_1$ received from the external device such as the mobile terminal, to the information processing section 60. The input image data $I_1$ is data in which gradation values of each pixel are described in the device-dependent color space. In the input image data $I_1$, the gradation values of each pixel include, for example, an 8-bit red gradation, an 8-bit green gradation, and an 8-bit blue gradation.

The input section 20 accepts input from a user (e.g., execution instruction, data input, etc.). The input section 20 performs, for example, when an interface for creating a conversion profile 45 (to be described later) is displayed on the display section 30, input in response to an input request from the displayed interface. The input section 20 transfers information inputted by the user to the information processing section 60. The display section 30 displays a screen on the basis of various pieces of screen data created by the information processing section 60. The display section 30 includes, for example, a liquid crystal panel, an organic EL (Electro Luminescence) panel, or the like.

The storage 40 stores, for example, a conversion table 41, an exclusion condition list 42, conversion profiles 44 and 45, a processing program 46, and a generation program 47. The storage 40 stores, for example, a voltage value file 43 generated in a drawing process to be described later.

The conversion table 41 describes a correspondence relationship between gradation values ($L_M$, $L_C$, $L_Y$) in a color space (leuco color space) of the recording medium 100 and command voltage values ($D_M$, $D_C$, $D_Y$) which are output setting parameters of the drawing section 50. The command voltage value $D_M$ is an output setting parameter of a light source 53A in the drawing section 50. The command voltage value $D_C$ is an output setting parameter of a light source 53B in the drawing section 50. The command voltage value $D_Y$ is an output setting parameter of a light source 53C in the drawing section 50.

If the command voltage values ($D_M$, $D_C$, $D_Y$) described in the conversion table 41 are excessively large, the drawing section 50 may cause the recording medium 100 to develop a color that is not a color to be developed. Therefore, it is preferable that the command voltage values ($D_M$, $D_C$, $D_Y$) described in the conversion table 41 be set within a range in which such a drawing defect does not occur. Further, it is preferable that the correspondence relationship between the gradation values ($L_M$, $L_C$, $L_Y$) and command voltage values ($D_M$, $D_C$, $D_Y$) in the conversion table 41 have a relation that facilitates creation of a color list 73 (see FIG. 5), which will be described later. Specifically, it is preferable that the correspondence relationship between the gradation values ($L_M$, $L_C$, $L_Y$) and the command voltage values ($D_M$, $D_C$, $D_Y$) in the conversion table 41 be set such that the color development in the recording medium 100 becomes a gray scale in a case where the gradation values ($L_M$, $L_C$, $L_Y$) of the respective colors are equal to each other.

The exclusion condition list 42 describes command voltage values ($D_{Mk}$, $D_{Ck}$, $D_{Yk}$) that are in a range in which an erasing defect or a medium deterioration defect may occur in the drawing on the recording medium 100 performed by the drawing section 50. Here, the erasing defect refers to a defect in which it is difficult to erase an image drawn on the recording medium 100 to a level that is difficult to visually recognize. The medium deterioration defect refers to a defect in which a laser light beam applied to the recording medium 100 is too strong and ablation occurs in the recording medium 100.

The voltage value file 43 is set on the basis of leuco image data 13 described in the leuco color space and the conversion table 41. The voltage value file 43 is a list of command voltage values ($D_{Mi}$, $D_{Ci}$, $D_{Yi}$) (i represents an addresses of a pixel) corresponding to gradation values ($L_{Mi}$, $L_{Ci}$, $L_{Yi}$) of each pixel of the leuco image data 13. In other words, the voltage value file 43 includes a plurality of sets of command voltage values ($D_{Mi}$, $D_{Ci}$, $D_{Yi}$). Here, the leuco image data 13 is generated on the basis of the externally inputted input image data $I_1$ described in the device-dependent color space. Thus, the voltage value file 43 is generated when the input image data $I_1$ is externally inputted. It is to be noted that, command voltage values ($D_{Mi}$, $D_{Ci}$, $D_{Yi}$) that match the exclusion condition list 42 in the list of command voltage values ($D_{Mi}$, $D_{Ci}$, $D_{Yi}$) included in the voltage value file 43 may be excluded from the voltage value file 43.

The conversion profiles 44 and 45 are each a so-called ICC (International Color Consortium) profile. The ICC profile is a series of data characterizing input/output devices and color spaces related to colors in accordance with the published standards of the ICC in color management.

The conversion profile 44 is an input profile in color management. The conversion profile 44 describes (maps) a relationship between the device-dependent color space and a device-independent color space. Here, the device-dependent color space is an RGB color space such as sRGB or adobe (registered trademark) RGB, for example. The device-independent color space is, for example, an L*a*b* color space. The conversion profile 45 is an output profile in color management. The conversion profile 45 describes (maps) a relationship between the device-independent color space and the leuco color space. The conversion profile 45 is generated in a generation process to be described below.

The processing program 46 includes a procedure of, using the conversion profiles 44 and 45, converting the input image data $I_1$ described in the device-dependent color space into the leuco image data 13 described in the leuco color space via the intermediate image data 12 described in the device-independent color space. The process of creating the leuco image data 13 by the processing program 46 is a part of a drawing process to be described later.

The generation program 47 includes a procedure of generating the conversion table 41 and combinations of gradation values ($L_M$, $L_C$, $L_Y$) of the respective colors in the leuco color space (hereinafter referred to as "leuco combination list 71"). The generation program 47 further includes a procedure of generating, on the basis of the conversion table 41, combinations of command voltage values ($D_M$, $D_C$, $D_Y$) corresponding to the leuco combination list 71 (hereinafter referred to as "voltage combination list 72"). The generation program 47 further includes a procedure of generating a color list 73 that describes a correspondence relationship between the leuco combination list 71 and the voltage combination list 72. The process of generating the color list 73 by the generation program 47 is a part of a generation process to be described later.

The information processing section 60 includes a processor and executes a program (e.g., the processing program 46 or the generation program 47) stored in the storage 40.

In the information processing section 60, a color management system optimal for recording medium 100 is configured by adapting the conversion profiles 44 and 45, which are ICC profiles. As functions of the color management system, it may be important to grasp a color space of the recording medium 100 and to compress (map) the color space from various color spaces (for example, the RGB color space such as sRGB or adobe (registered trademark) RGB). It is possible to easily manage these functions between color-related input/output devices by the conversion profile 44 and 45, which are ICC profiles. Color information exchange (gamut mapping/color space compression) based on an assumption of color reproduction is performed between input/output devices under respective color gamuts by the conversion profiles 44 and 45, which are ICC profiles.

The information processing section 60 converts the received input image data $I_1$ into the intermediate image data 12 by using the conversion profile 44 read from the storage 40, for example, by loading the processing program 46. The intermediate image data 12 is data in which values of each pixel are described in the device-independent color space. The device-independent color space is, for example, an L*a*b* color space. In the intermediate image data 12, the values of each pixel include L*a*b* values generated by being converted by the conversion profile 44.

The information processing section 60 further converts the intermediate image data 12 into the leuco image data 13 by using the conversion profile 45 read from the storage 40, for example, by loading the processing program 46. The leuco image data 13 is, for example, data in which gradation values of each pixel are described in the leuco color space. The leuco color space includes, for example, an 8-bit magenta gradation, an 8-bit cyan gradation, and an 8-bit yellow gradation. The information processing section 60 also transfers the leuco image data 13 to the drawing section 50, for example.

The information processing section 60 generates the conversion profile 45 by loading generation program 47 and causes the storage 40 to store the conversion profile 45, for example. The generation of the conversion profile 45 will be described in detail later.

Figure 3:
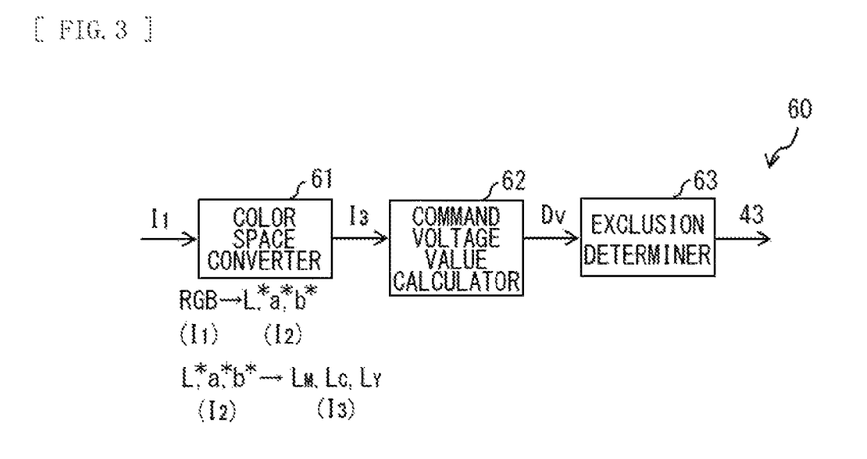
FIG. 3 is a diagram illustrating an example of functional blocks of an information processing section.

FIG. 3 illustrates an example of functional blocks of the information processing section 60. The information processing section 60 includes, for example, a color space converter 61, a command voltage value calculator 62, and an exclusion determiner 63, which perform the drawing process. It is to be noted that the exclusion determiner 63 may be omitted as necessary.

Upon receiving the input image data $I_1$ from outside via the communication section 10, the color space converter 61 converts the input image data $I_1$ into the intermediate image data 12 by using the conversion profile 44 read from the storage 40. In a case where the input image data $I_1$ is described in the adobe (registered trademark) RGB color space, the color space converter 61 converts the input image data $I_1$ into the intermediate image data 12 described in the L*a*b* color space by using the conversion profile from the adobe (registered trademark) RGB color space in to the L*a*b* color space described in the conversion profile 44.

The color space converter 61 further converts the intermediate image data 12 into the leuco image data 13 by using the conversion profile 45 read from the storage 40. In a case where the intermediate image data 12 is described in the L*a*b* color space, the color space converter 61 converts the intermediate image data 12 into the leuco image data 13 described in the leuco color space by using the conversion profile from the L*a*b* color space to leuco color space described in the conversion profile 45. The color space converter 61 transfers the leuco image data 13 to the command voltage value calculator 62.

The command voltage value calculator 62 generates command voltage values $D_V$ corresponding to the leuco image data 13 on the basis of the leuco image data 13 and the conversion table 41. Specifically, the command voltage value calculator 62 converts the gradation values ($L_{Mi}$, $L_{Ci}$, $L_{Yi}$) of the respective colors of each pixel of the leuco image data 13 into the command voltage values $D_V$ ($D_{Mi}$, Do, $D_{Yi}$), which are the output setting values of the drawing section 50, by using the conversion table 41 read from the storage 40. The command voltage value calculator 62 transfers a list of the command voltage values $D_V$ ($D_{Mi}$, Do, $D_{Yi}$) to the exclusion determiner 63.

The exclusion determiner 63 uses the exclusion condition list 42 read from the storage 40 to determine whether or not the command voltage values $D_V$ ($D_{Mk}$, $D_{Ck}$, $D_{Yk}$) that are in the range in which the erasing defect or the medium deterioration defect may occur in the drawing on the recording medium 100 performed by the drawing section 50 are included in the list of command voltage values $D_V$ ($D_{Mi}$, $D_{Ci}$, $D_{Yi}$). As a result, in a case where the command voltage value calculator 62 determines that the command voltage values $D_V$ ($D_{Mk}$, $D_{Ck}$, $D_{Yk}$) are included, the command voltage value calculator 62 replaces the relevant command voltage values $D_V$ ($D_M$, $D_C$, $D_Y$) with command voltage values $D_V$ ($D_M$, $D_C$, $D_Y$) that are out of the range in which the erasing defect or the medium deterioration defect may occur, and causes the storage 40 to store the thus obtained list of command voltage values $D_V$ ($D_{Mi}$, $D_{Ci}$, $D_{Yi}$) as the voltage value file 43. The exclusion determiner 63 further transfers the voltage value file 43 (list of command voltage values ($D_{Mi}$, $D_{Ci}$, $D_{Yi}$)) to the drawing section 50.

Figure 4:
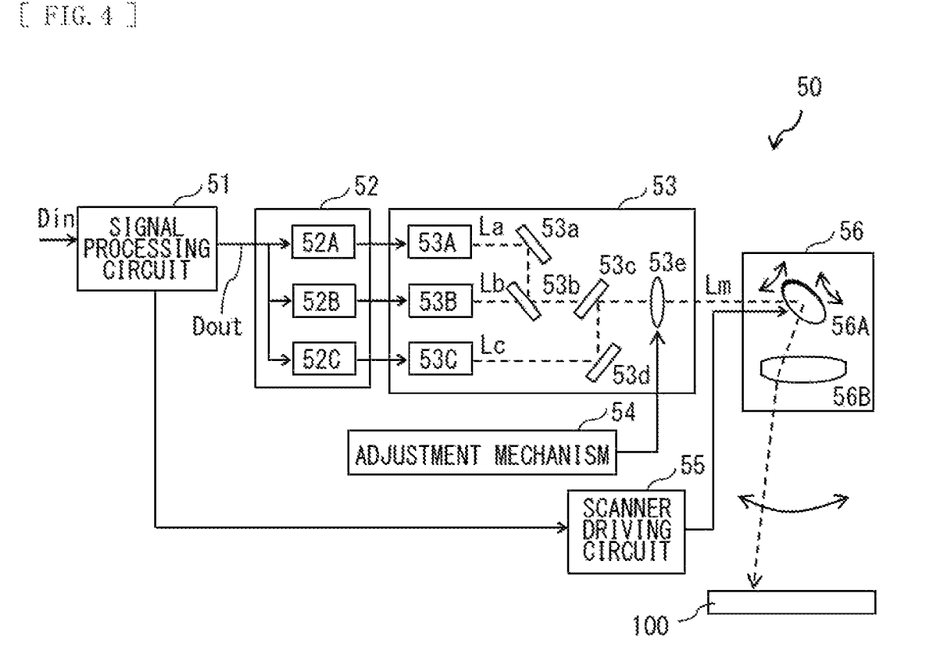
FIG. 4 is a diagram illustrating an exemplary schematic configuration of a drawing section.

Next, the drawing section 50 will be described. The drawing section 50 performs drawing on the recording medium 100 on the basis of the voltage value file 43 (list of command voltage values ($D_{Mi}$, $D_{Ci}$, $D_{Yi}$)) inputted from the information processing section 60. The drawing section 50 includes, for example, a signal processing circuit 51, a laser driving circuit 52, a light source section 53, an adjustment mechanism 54, a scanner driving circuit 55, and a scanner section 56, by which the drawing process is performed.

The signal processing circuit 51 acquires the voltage value file 43 (list of command voltage values ($D_{Mi}$, $D_{Ci}$, $D_{Yi}$)) inputted from the information processing section 60 as an image signal Din. The signal processing circuit 51 generates, for example, from the image signal Din, a pixel signal Dout corresponding to a scanner operation of the scanner section 56. The pixel signal Dout causes the light source section 53 (for example, each of light sources 53A, 53B, and 53C to be described later) to output a laser light beam having power corresponding to the command voltage values ($D_{Mi}$, $D_{Ci}$, $D_{Yi}$). The signal processing circuit 51 controls, together with the laser driving circuit 52, a peak value of current pulses to be applied to the light source section 53 (for example, each of the light sources 53A, 53B, and 53C) depending on the pixel signal Dout.

The laser driving circuit 52 drives each of the light sources 53A, 53B, and 53C of the light source section 53 in accordance with the pixel signal Dout, for example. The laser driving circuit 52 controls, for example, luminance (brightness) of a laser light beam for drawing an image corresponding to the pixel signal Dout. The laser driving circuit 52 includes, for example, a driving circuit 52A that drives the light source 53A, a driving circuit 52B that drives the light source 53B, and a driving circuit 52C that drives the light source 53C. The light sources 53A, 53B, and 53C each output a laser light beam having power corresponding to the command voltage values ($D_{Mi}$, $D_{Ci}$, $D_{Yi}$). The light sources 53A, 53B, and 53C each emit a laser light beam in the near infrared region. The light source 53A is, for example, a laser diode that emits a laser light beam La having a light emission wavelength λ1. The light source 53B is, for example, a laser diode that emits a laser light beam Lb having a light emission wavelength λ2. The light source 53C is, for example, a laser diode that emits a laser light beam $L_C$ having a light emission wavelength λ3. The light emission wavelengths λ1, λ2, and λ3 satisfy the following expressions (1), (2), and (3).

$$\lambda a1-20 \text{ nm} < \lambda 1 < \lambda a1+20 \text{ nm} \quad (1)$$

$$\lambda a2-20 \text{ nm} < \lambda 2 < \lambda a2+20 \text{ nm} \quad (2)$$

$$\lambda a3-20 \text{ nm} < \lambda 3 < \lambda a3+20 \text{ nm} \quad (3)$$

Here, λa1 is an absorption wavelength (absorption-peak wavelength) of the recording layer 113a, and is, for example, 915 nm. λa2 is an absorption wavelength (absorption-peak wavelength) of the recording layer 113b, and is, for example, 860 nm. λa3 is an absorption wavelength (absorption-peak wavelength) of the recording layer 113c, and is, for example, 760 nm. It is to be noted that "±20 nm" in expressions (1), (2), and (3) means an allowable error range. In a case where the light emission wavelengths λ1, λ2, and λ3 satisfy expressions (1), (2), and (3), the light emission wavelength λ1 is, for example, 915 nm, the light emission wavelength λ2 is, for example, 860 nm, and the light emission wavelength λ3 is, for example, 760 nm.

The light source section 53 has a plurality of light sources differing in light emission wavelengths in the near infrared region. The light source section 53 includes, for example, three light sources 53A, 53B, and 53C. The light source section 53 further includes, for example, an optical system that multiplexes laser light beams emitted from a plurality of light sources (e.g., the three light sources 53A, 53B, and 53C). The light source section 53 includes, for example, two reflection mirrors 53a and 53d, two dichroic mirrors 53b and 53c, and a lens 53e, as such an optical system.

Each of the laser light beams La and Lb emitted from the two light sources 53A and 53B is converted into substantially parallel light (collimated light) by a collimating lens, for example. Thereafter, for example, the laser light beam La is reflected by the reflection mirror 53a and further reflected by the dichroic mirror 53b, and the laser light beam Lb passes through the dichroic mirror 53b, and thus the laser light beam La and the laser light beam La are multiplexed together. Multiplexed light Lm of the laser light beam La and the laser light beam La is transmitted through a dichroic mirror 53c.

The laser light beam $L_C$ emitted from the light source 53C is converted into substantially parallel light (collimated light) by a collimating lens. Thereafter, for example, the laser light beam $L_C$ reflected by the reflection mirror 53d and further reflected by the dichroic mirror 53c. Thus, the multiplexed light transmitted through the dichroic mirror 53c and the laser light beam $L_C$ reflected by the dichroic mirror 53c are multiplexed together. The light source section 53, for example, outputs the multiplexed light Lm obtained by the multiplexing by the optical system to the scanner section 56.

The adjustment mechanism 54 is a mechanism for adjusting a focus of the multiplexed light Lm emitted from the light source section 53. The adjustment mechanism 54 is, for example, a mechanism for adjusting a position of the lens 53e by manual manipulation of a user. It is to be noted that the adjustment mechanism 54 may be a mechanism for adjusting the position of the lens 53e by mechanical manipulation.

The scanner driving circuit 55 drives the scanner section 56, for example, in synchronization with a projection image clock signal inputted from the signal processing circuit 51. Further, in a case where a signal of an irradiation angle of a later-described two-axis scanner 56A or the like is inputted from the from scanner section 56, the scanner driving circuit 55 drives the scanner section 56 to cause the irradiation angle to be a desired irradiation angle on the basis of the signal.

The scanner section 56, for example, raster-scans the surface of the recording medium 100 with the multiplexed light Lm outputted from the light source section 53. The scanner section 56 includes, for example, the two-axis scanner 56A and an fθ lens 56B. The two-axis scanner 56A is, for example, a galvanometer mirror. The fθ lens 56B converts a constant velocity movement by the two-axis scanner 56A into a constant velocity linear movement of a spot moving on the focal plane (the surface of the recording medium 100). It is to be noted that the scanner section 56 may include a one-axis scanner and an fθ lens. In this case, it is preferable that a one-axis stage for displacing the recording medium 100 in a direction perpendicular to a scanning direction of the one-axis scanner be provided.

Next, an example of performing writing information in the drawing device 1 will be described.

[Writing]

First, the user prepares the recording medium 100 and sets the recording medium 100 in the drawing section 50. The user then sends the input image data $I_1$ described in the RGB color space from the terminal device to the drawing system 1 via the network. Upon receiving the input image data $I_1$ via the network, the drawing system 1 performs the following drawing process.

First, upon receiving the input image data $I_1$ via the communication section 10, the information processing section 60 converts the input image data $I_1$ described in the RGB color space into the intermediate image data 12 described in the L*a*b* color space by using the conversion profile 44 read from the storage 40. Subsequently, the information processing section 60 converts the intermediate image data 12 described in the L*a*b* color space into the leuco image data 13 described in the leuco color space by using the conversion profile 45 read from the storage 40.

Next, the information processing section 60 converts the gradation values ($L_{Mi}$, $L_{Ci}$, $L_{Yi}$) of the respective colors of each pixel of the leuco image data 13 into the command voltage values $D_V$ ($D_{Mi}$, $D_{Ci}$, DO which are output setting values of the drawing section 50, by using the conversion table 41 read from the storage 40. Subsequently, the information processing section 60 uses the exclusion condition list 42 read from the storage 40 to determine whether or not the command voltage values $D_V$ ($D_{Mk}$, $D_{Ck}$, $D_{Yk}$) that are in the range in which the erasing defect or the medium deterioration defect may occur in the drawing on the recording medium 100 performed by the drawing section 50 are included in the list of command voltage values $D_V$ ($D_{Mi}$, $D_{Yi}$). As a result, in a case where the information processing section 60 determines that the command voltage values $D_V$ ($D_{Mk}$, $D_{Ck}$, $D_{Yk}$) are included, the ($D_M$, $D_C$, $D_Y$) from the list of command voltage values $D_V$ ($D_{Mi}$, $D_{Ci}$, $D_{Yi}$), and causes the storage 40 to store the thus obtained list of the command voltage values $D_V$ ($D_{Mi}$, $D_{Ci}$, $D_{Yi}$) as the voltage value file 43.

The information processing section 60 further transfers the voltage value file 43 (list of command voltage values ($D_M$, $D_C$, $D_Y$)) to the drawing section 50. The signal processing circuit 51 of the drawing section 50 acquires the voltage value file 43 (list of command voltage values ($D_M$, $D_C$, $D_Y$)) inputted from the information processing section 60 as the image signal Din. The signal processing circuit 51 generates, on the basis of the image signal Din, an image signal that is synchronized with a scanner operation of the scanner section 56 and corresponds to characteristics such as a wavelength of a laser light beam. The signal processing circuit 51 generates a projection image signal such that the laser light beam emits light according to the generated image signal. The signal processing circuit 51 outputs the generated projection image signal to the laser driving circuit 52 of the drawing section 50.

The laser driving circuit 52 drives the light sources 53A, 53B, and 53C of the light source section 53 in accordance with projection image signals corresponding to the respective wavelengths. In this case, the laser driving circuit 52 causes a laser light beam to be emitted from at least one light source out of the light source 53A, the light source 53B, and the light source 53C, for example, and to be scanned on the recording medium 100.

As a result, for example, the laser light beam La having a light emission wavelength of 760 nm is absorbed by the photothermal conversion agent 100B in the recording layer 113c, whereby the leuco dye 100A in the recording layer 113c reaches a writing temperature by the heat generated from the photothermal conversion agent 100B, and is combined with a developer to develop a yellow color. A color density of the yellow color depends on an intensity of the laser light beam La having the light emission wavelength of 760 nm. Further, for example, the laser light beam Lb having a light emission wavelength of 860 nm is absorbed by the photothermal conversion agent 100B in the recording layer 113b, whereby the leuco dye 100A in the recording layer 113b reaches a writing temperature by the heat generated from the photothermal conversion agent 100B, and is combined with a developer to develop a cyan color. A color density of the cyan color depends on an intensity of the laser light beam Lb having the light emission wavelength of 860 nm. Further, for example, the laser light beam $L_C$ having a light emission wavelength of 915 nm is absorbed by the photothermal conversion agent 100B in the recording layer 113a, whereby the leuco dye 100A in the recording layer 113a reaches a writing temperature by the heat generated from the photothermal conversion agent 100B, and is combined with a developer to develop a magenta color. A color density of the magenta color depends on an intensity of the laser light beam $L_C$ having the light emission wavelength of 915 nm. As a result, a desired color is developed by the color mixture of yellow, cyan, and magenta colors. In this manner, the drawing section 50 writes information on the recording medium 100.

Next, an example of a procedure of creating the conversion profile 45 that is necessary for writing information in the drawing system 1 will be described.

[Creation of Conversion Profile 45]

Figure 5:
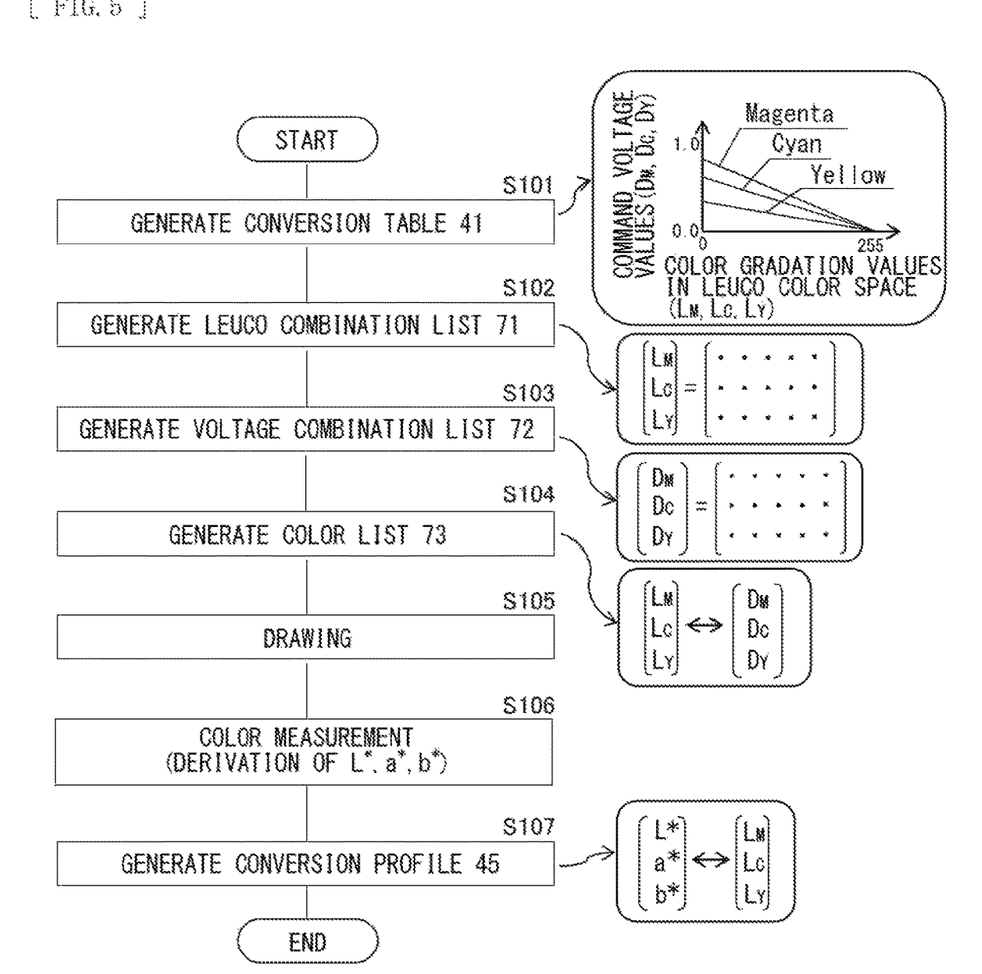
FIG. 5 is a diagram illustrating an example of a procedure of generating a conversion profile.

FIG. 5 illustrates the example of the procedure of creating the conversion profile 45. First, the user prepares the recording medium 100 and sets the recording medium 100 in the drawing section 50. The user then manipulates the input section 20 to send a request to display an interface for creating the conversion profile 45. The information processing section 60 transmits, in response to the request, screen data for creating the conversion profile 45 to the display section 30. The display section 30 displays the interface for creating the conversion profile 45 on the basis of the screen data created by the information processing section 60. Subsequently, the user issues an instruction to perform operation of creating the conversion profile 45 by manipulating the input section 20 on the basis of the display of the interface for creating the conversion profile 45. The information processing section 60 then performs the operation of creating the conversion profile 45 in response to the instruction.

First, the information processing section 60 generates the conversion table 41 (step S101). In generating the conversion table 41, first, the information processing section 60 sets maximum values of the command voltage values ($D_M$, $D_C$, $D_Y$) of Magenta, Gyan, and Yellow in the color gamut of the leuco color space (hereinafter, simply referred to as "maximum values of the command voltage values ($D_M$, $D_C$, $D_Y$)"). Specifically, the information processing section 60 sends a request to the user to input the maximum values of the command voltage values ($D_M$, $D_C$, $D_Y$) via the display section 30. The user inputs the maximum values of the command voltage values ($D_M$, $D_C$, $D_Y$) by manipulating the input section 20. At this time, it is preferable that the user inputs values that are in a range in which a drawing defect does not occur. In a case where the user inputs values that are in the range in which the drawing defect does not occur, the information processing section 60 creates the conversion table 41 by excluding command voltage values ($D_M$, $D_C$, $D_Y$) that are in a range in which the drawing defect may occur. For example, the information processing section 60 sets the values inputted to the input section 20 as command voltage values ($D_M$, $D_C$, $D_Y$) where the gradation values ($L_M$, $M_C$, $L_Y$) in the leuco color space are 0, and sets the command voltage values ($D_M$, $D_C$, $D_Y$) where the gradation values ($L_M$, $M_C$, $L_Y$) in the leuco color space are 255 to 0. For example, the information processing section 60 sets the command voltage values ($D_M$, $D_C$, $D_Y$) where the gradation values ($L_M$, $M_C$, $L_Y$) in the leuco color space are 1 to 254, by performing a predetermined interpolation process. In this way, the information processing section 60 generates the conversion table 41. Example of the interpolation process include a process in which a color development of the recording medium 100 becomes a gray scale in a case where the gradation values ($L_M$, $L_C$, $L_Y$) of the respective colors are equal to each other in the correspondence relationship between the gradation values ($L_M$, $M_C$, $L_Y$) in the leuco color space and the command voltage values ($D_M$, $D_C$, $D_Y$).

Next, the information processing section 60 generates combinations of gradation values ($L_M$, $L_C$, $L_Y$) of the respective colors in the leuco color space (the leuco combination list 71) (step S102). The information processing section 60 further generates combinations of command voltage values ($D_M$, $D_C$, $D_Y$) corresponding to the leuco combination list 71 (the voltage combination list 72) on the basis of the conversion table 41 (step S103). Next, the information processing section 60 generates the color list 73 that describes the correspondence relationship between the leuco combination list 71 and the voltage combination list 72 (step S104). The information processing section 60 transfers the generated color list 73 to the drawing section 50.

Upon receiving the color list 73 from the information processing section 60, the signal processing circuit 51 of the drawing section 50 performs drawing on the recording medium 100 on the basis of the color list 73 (step S105). As a result, a color chart is formed on the recording medium 100. The user performs color measurement on the color chart on the recording medium 100 (step S106). Specifically, the user obtains a spectral reflectance by measuring the color chart on the recording medium 100 with a spectrophotometer.

Thereafter, the user sends a request to input the spectral reflectance by manipulating the input section 20. In response to the request, the information processing section 60 transmits to the display section 30 screen data for inputting the spectral reflectance. The display section 30 displays an interface for inputting the spectral reflectance on the basis of the screen data created by the information processing section 60. Subsequently, the user inputs the spectral reflectance into the drawing system 1 via the communication section 10 by manipulating the input section 20 on the basis of the display of the interface for inputting the spectral reflectance. Then, the information processing section 60 calculates the L*a*b* values of the color chart on the basis of the inputted spectral reflectance. The information processing section 60 generates the conversion profile 45 describing a correspondence relationship between the L*a*b* values of the color chart obtained by the calculation and the gradation values in the leuco color space included in the color list 73 (step S107). In this way, the conversion profile 45 is generated.

[Effects]

Next, effects of the drawing system 1 according to the present embodiment will be described.

A heat-sensitive recording medium including a leuco dye, which is one of heat-sensitive color developing compositions, has been in widespread use. Examples of such a recording medium which has currently been practically used include an irreversible recording medium which is not able to be erased after being written once and a reversible recording medium which is able to be rewritten many times. However, there has been an issue that it is difficult to achieve faithful color reproduction in drawing on a heat-sensitive recording medium including a leuco dye.

In contrast, the drawing system 1 according to the present embodiment generates the command voltage values ($D_M$, $D_C$, $D_Y$) corresponding to the leuco image data 13 on the basis of the leuco image data 13 described in the leuco color space and the conversion table 41. The conversion table 41 describes the correspondence relationship between the gradation values ($L_M$, $L_C$, $L_Y$) in the leuco color space and the command voltage values ($D_M$, $D_C$, $D_Y$). This provides command voltage values ($D_M$, $D_C$, $D_Y$) suitable for drawing the leuco image data 13. As a result, it is possible to achieve faithful color reproduction on the recording medium 100.

Further, the drawing system 1 according to the present embodiment excludes, from the voltage value file 43, command voltage values ($D_{Mi}$, $D_{Ci}$, $D_{Yi}$) that match the exclusion condition list 42 in the list of command voltage values ($D_{Mi}$, $D_{Yi}$) included in the voltage value file 43. This makes it possible to prevent the erasing defect or the medium deterioration defect from occurring in the drawing on the recording medium 100 by the drawing section 50.

Further, in the drawing system 1 according to the present embodiment, the light source section 53 of the drawing section 50 outputs a laser light beam having power corresponding to the command voltage values ($D_{Mi}$, $D_{Ci}$, $D_{Yi}$). This makes it possible to output a laser light beam having power suitable for performing drawing on the recording medium 100. As a result, it is possible to achieve faithful color reproduction on the recording medium 100.

Further, the drawing system 1 according to the present embodiment uses the conversion profiles 44 and 45 to convert the input image data $I_1$ described in the device-dependent color space into the leuco image data 13 described in the leuco color space. This makes it possible to obtain command voltage values ($D_M$, $D_C$, $D_Y$) suitable for drawing the leuco image data 13. As a result, it is possible to achieve faithful color reproduction on the recording medium 100.

Further, in the drawing system 1 according to the present embodiment, in the case where the device-dependent color space is the RGB color space and the device-independent color space is the L*a*b* color space, it is possible to achieve faithful color reproduction on the recording medium 100 by using the general-purpose conversion profile 44.

Further, the drawing system 1 according to the present embodiment includes the conversion profile 44 in which the relationship between the device-dependent color space and the device-independent color space is described (mapped) and the conversion profile 45 in which the relationship between the device-independent color space and the leuco color space is described (mapped). As a result, the drawing system 1 is provided with a color management system suitable for the recording medium 100, and thus, it is possible to achieve faithful color reproduction on the recording medium 100

Further, the method of creating the conversion profile 45 according to the present embodiment involves generating the color list 73 that describes the correspondence relationship between the combinations of gradation values ($L_M$, $L_C$, $L_Y$) in the leuco color space (the leuco combination list 71) and the combinations of command voltage values ($D_M$, $D_C$, $D_Y$) corresponding to the leuco combination list 71 (the voltage combination list 72), on the basis of the gradation values ($L_M$, $L_C$, $L_Y$) in the leuco color space and the conversion table 41. Thereafter, a conversion profile 45 is generated that describes the correspondence relationship between the values in the device-independent color space obtained by performing color measurement on the color chart of the recording medium 100 drawn on the basis of the color list 73 and the gradation values in the leuco color space included in the color list 73. This makes it possible to obtain the command voltage values ($D_M$, $D_C$, $D_Y$) suitable for drawing the leuco image data 13. As a result, it is possible to achieve faithful color reproduction on the recording medium 100.

Further, in the method of creating the conversion profile 45 according to the present embodiment, in the case where command voltage values $D_V$ ($D_{Mk}$, $D_{Ck}$, $D_{Yk}$) that are in the range in which the erasing defect or the medium deterioration defect may occur in the drawing on the recording medium 100 performed by the drawing section 50 are included in the list of command voltage values $D_V$ ($D_{Mi}$, $D_{Ci}$, $D_{Yi}$), the relevant command voltage values $D_V$ ($D_M$, $D_C$, $D_Y$) are replaced with command voltage values $D_V$ ($D_M$, $D_C$, $D_Y$) that are out of the range in which the erasing defect or the medium deterioration defect may occur. This makes it possible to prevent the erasing defect or the medium deterioration defect from occurring in the recording medium 100.

2. Second Embodiment

[Configuration]

Figure 6:
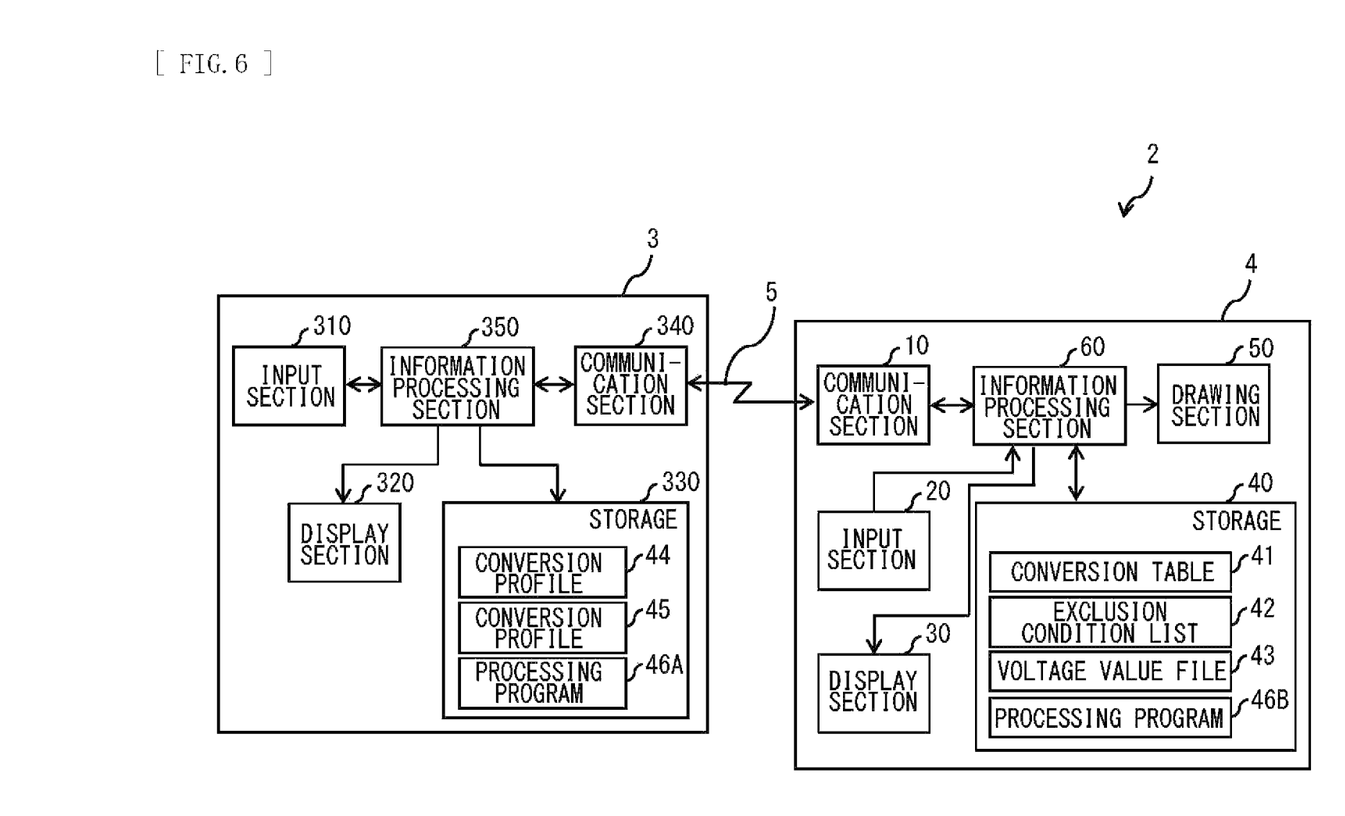
FIG. 6 is a diagram illustrating an exemplary schematic configuration of a drawing system according to a second embodiment of the present disclosure.

A drawing system 2 according to a second embodiment of the present disclosure will be described. FIG. 6 illustrates an exemplary schematic configuration of the drawing system 2 according to the present embodiment. The drawing system 2 performs writing (drawing) and erasing of information on the recording medium 100. Specifically, the drawing system 2 converts, in a terminal device 3, the input image data $I_1$ into the leuco image data 13. The drawing system 2 further converts, in a drawing device 4, the leuco image data 13 into output setting values of the drawing section 50 and inputs the output setting values obtained by the conversion to the drawing section 50 to thereby perform drawing on the recording medium 100. In this manner, the drawing system 2 includes a color management system suitable for the recording medium 100.

The drawing system 2 includes the terminal device 3 and the drawing device 4. The terminal device 3 is coupled to a network 5 via a communication section 340. The drawing device 4 is coupled to the network 5 via the communication section 10. The network 5 is, for example, a communication line such as LAN or WAN. The terminal device 3 is configured to be able to communicate with the drawing device 4 via the network 5. The drawing device 4 is configured to be able to communicate with the terminal device 3 via the network.

The terminal device 3 includes, for example, an input section 310, a display section 320, a storage 330, the communication section 340, and an information processing section 350.

The communication section 340 communicates with the drawing device 4. The communication section 340 transfers various pieces of data received from the drawing device 4 to the information processing section 350. The input section 310 accepts input from the user (e.g., execution instruction, data input, etc.). The input section 310 transfers information inputted by the user to the information processing section 350. The display section 320 displays a screen on the basis of various pieces of screen data created by the information processing section 350. The display section 320 includes, for example, a liquid crystal panel, an organic EL (Electro Luminescence) panel, or the like.

The storage 330 stores, for example, the conversion table 41, the conversion profiles 44 and 45, and a processing program 46A. The processing program 46A includes the former stage of the procedure (the procedure up to generating the leuco image data 13) in the drawing process according to the above embodiment.

Figure 7:
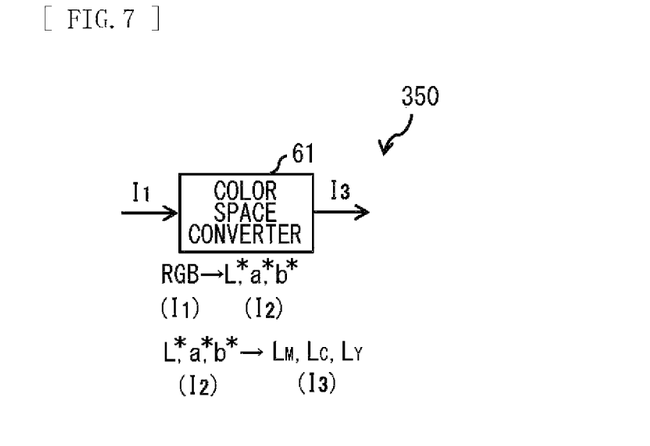
FIG. 7 is a diagram illustrating an example of functional blocks of an information processing section included in a terminal device.

The information processing section 350 includes a processor and executes a program (e.g., the processing program 46A) stored in the storage 330. The information processing section 350 converts the received input image data $I_1$ into the intermediate image data 12 by using the conversion profile 44, for example, by loading the processing program 46A. The information processing section 350 converts the intermediate image data 12 into the leuco image data 13 by using the conversion profile 45, for example, by loading the processing program 46A. The information processing section 350 also transfers the leuco image data 13, for example, to the information processing section 350 via the communication section 340 and the network 5. As illustrated in FIG. 7, the information processing section 350 includes, for example, the color space converter 61. The color space converter 61 executes the series of processes described above to generate the leuco image data 13, and transmits the leuco image data 13 to the drawing device 4 via the communication section 340 and the network 5.

The drawing device 4 includes, for example, the communication section 10, the input section 20, the display section 30, the storage 40, the drawing section 50, and the information processing section 60. In the drawing device 4, the storage 40 includes the conversion table 41, the exclusion condition list 42, and a processing program 46B. In the drawing device 4, the storage 40 includes the voltage value file 43. The processing program 46B includes the latter stage of the procedure (the procedure from the setting of the specified voltage values) in the drawing process according to the above embodiment.

Figure 8:
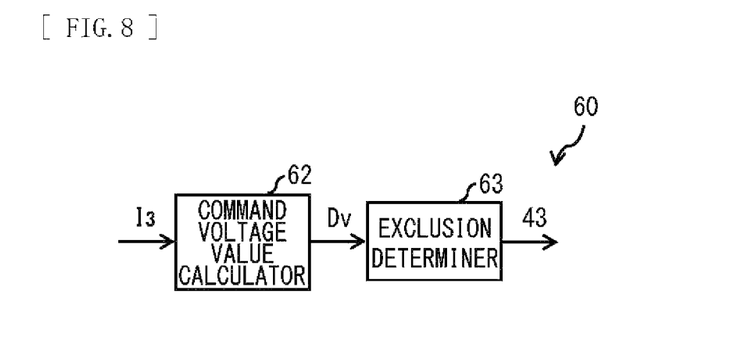
FIG. 8 is a diagram illustrating an example of functional blocks of an information processing section included in a terminal device.

The information processing section 60 includes a processor and executes a program (e.g., the processing program 46B) stored in the storage 40. The information processing section 60 converts gradation values ($L_{Mi}$, $L_{Ci}$, $L_{Yi}$) of the respective colors of each pixel of the leuco image data 13 into command voltage values $D_V$ ($D_{Mi}$, $D_{Ci}$, $D_{Yi}$) by using the conversion table 41, for example, by loading the processing program 46B. The information processing section 60 determines whether or not the command voltage values $D_V$ ($D_{Mk}$, $D_{Ck}$, $D_{Yk}$) that are in the range in which the erasing defect or the medium deterioration defect may occur in the drawing on the recording medium 100 performed by the drawing section 50 are included in the list of command voltage values $D_V$ ($D_{Mi}$, $D_{Ci}$, $D_{Yi}$), by using the exclusion condition list 42, for example, by loading the processing program 46B. As a result, in a case where the information processing section 60 determines that the command voltage values $D_V$ ($D_{Mk}$, $D_{Ck}$, $D_{Yk}$) are included, the information processing section 60 replaces the relevant command voltage values $D_V$ ($D_M$, $D_C$, $D_Y$) with command voltage values $D_V$ ($D_M$, $D_C$, $D_Y$) that are out of the range in which the erasing defect or the medium deterioration defect may occur, and transmits the thus obtained list of command voltage values $D_V$ ($D_{Mi}$, $D_{Ci}$, $D_{Yi}$) to the drawing section 50. As illustrated in FIG. 8, the information processing section 60 includes, for example, the command voltage value calculator 62 and the exclusion determiner 63. The command voltage value calculator 62 and the exclusion determiner 63 execute the series of processes described above to generate the voltage value file 43 (list of command voltage values $D_V$ ($D_{Mi}$, $D_{Ci}$, DO), and transmit the voltage value file 43 to the drawing section 50.

[Writing]

Next, an example of writing information in the drawing system 2 will be described. First, the user prepares the recording medium 100 and sets the recording medium 100 in the drawing section 50. The user then manipulates the input section 310 to send a request to display an interface for color space conversion. The information processing section 350 transmits, in response to the request, screen data for color space conversion to the display section 320. The display section 320 displays the interface for color space conversion on the basis of the screen data created by the information processing section 350. Subsequently, the user causes the storage 330 of the terminal device 3 to store the input image data $I_1$ by manipulating the input section 310 on the basis of the display of the interface for color space conversion. Thereafter, the user issues an instruction to perform color space conversion operation to convert the entered input image data $I_1$ into the leuco image data 13 on the basis of the display of the interface for color space conversion. The information processing section 350 then performs the color space conversion operation in response to the instruction.

First, the information processing section 350 converts the input image data $I_1$ inputted from the user into the intermediate image data 12 described in the L*a*b* color space by using the conversion profile 44 read from the storage 330. Subsequently, the information processing section 350 converts the intermediate image data 12 described in the L*a*b* color space into the leuco image data 13 described in the leuco color space by using the conversion profile 45 read from the storage 330. Thereafter, the information processing section 350 transmits the leuco image data 13 to the drawing device 4 via the communication section 340 and the network 5.

Upon receiving the leuco image data 13 via the communication section 10, the information processing section 60 of the drawing device 4 converts the gradation values ($L_{Mi}$, $L_{Ci}$, $L_{Yi}$) of the respective colors of each pixel of the leuco image data 13 into the command voltage values $D_V$ ($D_{Mi}$, $D_{Ci}$, $D_{Yi}$) which are output setting values of the drawing section 50, by using the conversion table 41 read from the storage 40. Subsequently, the information processing section 60 uses the exclusion condition list 42 read from the storage 40 to determine whether or not the command voltage values $D_V$ ($D_{Mk}$, $D_{Ck}$, $D_{Yk}$) that are in the range in which the erasing defect or the medium deterioration defect may occur in the drawing on the recording medium 100 performed by the drawing section 50 are included in the list of command voltage values $D_V$ ($D_{Mi}$, $D_{Yi}$). As a result, in a case where the information processing section 60 determines that the command voltage values $D_V$ ($D_{Mk}$, $D_{Ck}$, $D_{Yk}$) are included, the information processing section 60 excludes the command voltage values $D_V$ ($D_{Mk}$, $D_{Ck}$, $D_{Yk}$) ($D_M$, $D_C$, $D_Y$) from the list of command voltage values $D_V$ ($D_{Mi}$, $D_{Ci}$, $D_{Yi}$), and causes the storage 40 to store the thus obtained list of the command voltage values $D_V$ ($D_{Mi}$, $D_{Yi}$) as the voltage value file 43.

The information processing section 60 further transfers the voltage value file 43 (list of command voltage values ($D_M$, $D_C$, $D_Y$)) to the drawing section 50. The signal processing circuit 51 of the drawing section 50 acquires the voltage value file 43 (list of command voltage values ($D_M$, $D_C$, $D_Y$)) inputted from the information processing section 60 as the image signal Din. The signal processing circuit 51 generates, on the basis of the image signal Din, an image signal that is synchronized with a scanner operation of the scanner section 56 and corresponds to characteristics such as a wavelength of a laser light beam. The signal processing circuit 51 generates a projection image signal such that the laser light beam emits light according to the generated image signal. The signal processing circuit 51 outputs the generated projection image signal to the laser driving circuit 52 of the drawing section 50.

The laser driving circuit 52 drives the light sources 53A, 53B, and 53C of the light source section 53 in accordance with projection image signals corresponding to the respective wavelengths. In this case, the laser driving circuit 52 causes a laser light beam to be emitted from at least one light source out of the light source 53A, the light source 53B, and the light source 53C, for example, and to be scanned on the recording medium 100. As a result, a desired color is developed by the color mixture of yellow, cyan, and magenta colors. In this manner, the drawing section 50 writes information on the recording medium 100.

In the drawing system 2 according to the present embodiment, the device (terminal device 3) that executes the processes for generating the leuco image data 13 from the input image data $I_1$ is different from the device (information processing section executed by the drawing system 1 according to the above embodiment. However, in the drawing system 2 according to the present embodiment, the drawing processes that are similar to those in the above embodiment are executed. Therefore, the drawing system 2 according to the present embodiment has effects similar to those of the above embodiment.

Although the present disclosure has been described with reference to the embodiments and modification examples thereof, the present disclosure is not limited to the above embodiments and the like, and various modifications can be made.

Modification Example A

In each of the above embodiments, the conversion profile 45 may be provided for each type of recording medium 100 on which the drawing is to be performed. In such a case, it is possible to achieve faithful color reproduction for various types of recording medium 100.

Modification Example B

Further, in the above embodiments, the three recording layers 113 (113a, 113b, and 113c) may each be an irreversible recording layer that is not able to be returned to the decolored state once it turns into the color-developed state.

Modification Example C

In each of the above embodiments and the like, the recording medium 100 has the recording layers 113 and the heat-insulating layers 114 that are alternately stacked. However, for example, the recording medium 100 may include a microcapsule containing the leuco dye 100A and the photothermal conversion agent 100B. Further, for example, in the above embodiments and the like, the recording layers 113 (113a, 113b, and 113c) each include the leuco dye 100A as a reversible heat-sensitive color developing composition, but may include a material different from the leuco dye 100A. Further, for example, in the above embodiments and the like, the drawing systems 1 and 2 may each be configured to perform writing and erasing of information on the recording medium 100, or may be configured to perform at least writing, out of writing and erasing, of information on the recording medium 100.

Modification Example D

For example, in the above embodiments and the like, the intermediate image data 12 is described in the L*a*b* color space. However, for example, in the above-described embodiments or the like, the intermediate image data 12 may be described in an XYZ color space which is one of the device-independent color spaces. In this case, the color space converter 61 uses a conversion profile from the XYZ color space to the leuco color space described in the conversion profile 45, to convert the intermediate image data 12 into the leuco image data 13 described in the leuco color space. Further, in this case, it is assumed that the L*a*b* color space is read as the XYZ color space in the above-described embodiments or the like. However, the process between the color measurement of the color chart and the generation of the conversion profile 45 is read as follows.

The user performs the color measurement of the color chart on the recording medium 100 (step S106). Specifically, the user obtains image data of the XYZ color space by measuring the color chart on the recording medium 100 using a XYZ-colorimetric camera having a sensitivity equivalent to human eyes. Thereafter, the user sends a request to input image data of the XYZ color space by manipulating the input section 20. The information processing section 60 transmits, to the display section 30, image data for inputting the image data of the XYZ color space in response to the request. The display section 30 displays an interface for inputting the image data of the XYZ color space on the basis of the screen data created by the information processing section 60. Subsequently, the user inputs the image data of the XYZ color space to the drawing system 1 via the communication section 10 by manipulating the input section 20 on the basis of the display of the interface for inputting the image data of the XYZ color space. Then, the information processing section 60 calculates the L*a*b* values of the color chart on the basis of the inputted image data of the XYZ color space. The information processing section 60 generates the conversion profile describing a correspondence relationship between the L*a*b* values of the color chart obtained by the calculation and the gradation values in the leuco color space included in the color list 73 (step S107). In this way, the conversion profile 45 is generated.

Modification Example E

In the above embodiments and the like, for example, the conversion profiles 44 and 45, which are each one type of the ICC profile, are used. However, in the above embodiments and the like, a conversion profile 48 that is one type of a device link profile may be used instead of the conversion profiles 44 and 45. The conversion profile 48 describes (maps) a relationship between the device-dependent color space and the leuco color space. The conversion profile 48 is generated, for example, on the basis of the conversion profile 44 and the conversion profile 45. Also in such a case, effects that are similar to those of the above embodiments and the like are obtained.

It is to be noted that the effects described herein are mere examples. Effects of an example embodiment and modification examples of the disclosure are not limited to those described herein. The disclosure may further include any effects other than those described herein.

Moreover, the present disclosure may have the following configurations, for example.

(1)
  A drawing system including:
    a storage that stores a conversion table that describes a correspondence relationship between gradation values in a leuco color space and output setting values of light sources;
    a generator that generates, on a basis of leuco image data described in the leuco color space and the conversion table, the output setting values corresponding to the leuco image data; and
    a drawing section that performs drawing on a recording medium on a basis of the output setting values generated by the generator, the recording medium including a plurality of recording layers, the plurality of recording layers each including a leuco dye and a photothermal conversion agent.
(2)
  The drawing system according to (1), in which
    the storage further stores an exclusion condition list that describes the output setting values that are in a range in which an erasing defect or a medium deterioration defect may occur in drawing on the recording medium performed by the drawing section,
    the drawing system further includes a creation section that creates an output setting file by replacing the output setting values that match the exclusion condition list, out of a plurality of sets of the output setting values generated by the generator, with the output setting values that are in the range in which the erasing defect or the medium deterioration defect may occur, and
    the drawing section performs drawing on the recording medium on a basis of the output setting file created by the creation section.
(3)
  The drawing system according to (1) or (2), in which the drawing section includes a light source section that outputs a laser light beam having power corresponding to the output setting values.
(4)
  The drawing system according to any one of (1) to (3), in which
    the storage further stores a conversion profile that describes a relationship between a device-dependent color space and a device-independent color space, and that describes a relationship between the device-independent color space and the leuco color space, and
    the drawing system further includes a converter that converts image data described in the device-dependent color space into the leuco image data described in the leuco color space.
(5)
  The drawing system according to (4), in which the conversion profile is provided for each type of recording medium on which drawing is to be performed.
(6)
  The drawing system according to (4) or (5), in which
    the device-dependent color space is an RGB color space, and
    the device-independent color space is an L*a*b* color space or an XYZ color space.
(7)
  A method of creating a conversion profile, the method including:
    generating a color list on a basis of a conversion table that describes a correspondence relationship between gradation values in a leuco color space and output setting values of light sources, the color list describing a correspondence relationship between combinations of gradation values of respective colors in the leuco color space and the output setting values corresponding to the combinations; and
    generating a conversion profile that describes a correspondence relationship between values in a device-independent color space and the gradation values in the leuco color space included in the color list, the values in the device-independent color space being obtained by performing color measurement on a recording medium on which drawing has been performed on a basis of the color list, the recording medium including a plurality of recording layers, the plurality of recording layers each including a leuco dye and a photothermal conversion agent.
(8)
  The method of creating the conversion profile according to (7), further including generating the conversion table, in which
    the forming the conversion table includes creating the conversion table by excluding, from the output setting values, the output setting values that are in a range in which a defect occurs, the defect being that the recording medium develops a color which is different from a color to be developed.
(9)
  A drawing system including a storage that stores a conversion profile that describes a relationship between a device-dependent color space and a device-independent color space, and that describes a relationship between the device-independent color space and the leuco color space.

(10)

The drawing system according to (9), in which the conversion profile is provided for each type of recording medium on which drawing is to be performed.

(11)

The drawing system according to (9) or (10), in which
the device-dependent color space is an RGB color space, and
the device-independent color space is an L*a*b* color space or an XYZ color space.

(12)

The drawing system according to any one of (9) to (11), in which
the storage further stores a conversion table that describes a correspondence relationship between gradation values in the leuco color space and output setting values of light sources, and
the drawing system further includes
a generator that generates, on a basis of leuco image data described in the leuco color space and the conversion table, the output setting values corresponding to the leuco image data, and
a drawing section that performs drawing on a recording medium on a basis of the output setting values generated by the generator, the recording medium including a plurality of recording layers, the plurality of recording layers each including a leuco dye and a photothermal conversion agent.

(13)

The drawing system according to (12), in which the drawing section includes a light source section that outputs a laser light beam having power corresponding to the output setting values.

(14)

The drawing system according to (12) or (13), in which
the storage further stores an exclusion condition list that describes the output setting values that are in a range in which an erasing defect or a medium deterioration defect may occur in drawing on the recording medium performed by the drawing section,
the drawing system further includes a creation section that creates an output setting file by replacing the output setting values that match the exclusion condition list, out of a plurality of sets of the output setting values generated by the generator, with the output setting values that are in the range in which the erasing defect or the medium deterioration defect may occur, and
the drawing section performs drawing on the recording medium on a basis of the output setting file created by the creation section.

(15)

A terminal device including a storage that stores a conversion profile that describes a relationship between a device-dependent color space and a device-independent color space, and that describes a relationship between the device-independent color space and the leuco color space.

(16)

The terminal device according to (15), in which the conversion profile is provided for each type of recording medium on which drawing is to be performed.

(17)

The terminal device according to (15) or (16), in which
the device-dependent color space is an RGB color space, and
the device-independent color space is an L*a*b* color space or an XYZ color space.

According to the drawing system of one embodiment of the present disclosure, the output setting values corresponding to the leuco image data is generated on the basis of the leuco image data described in the leuco color space and the conversion table. Thus, output setting values suitable for drawing the leuco image data are obtained. As a result, it becomes possible to achieve faithful color reproduction on a heat-sensitive recording medium including a leuco dye.

According to the method of creating the conversion profile of one embodiment of the present disclosure, the color list is generated on the basis of the conversion table, the color list describing the correspondence relationship between combinations of gradation values of respective colors in the leuco color space and the output setting values corresponding to the combinations, and the conversion profile is generated that describes the correspondence relationship between values in a device-independent color space and the gradation values in the leuco color space included in the color list, the values in the device-independent color space being obtained by performing color measurement on the recording medium on which drawing has been performed on the basis of the color list. Thus, output setting values suitable for drawing the leuco image data are obtained by using the color list and the conversion profile. As a result, it becomes possible to achieve faithful color reproduction on a heat-sensitive recording medium including a leuco dye.

This application claims the benefit of Japanese Priority Patent Application JP2018-172663 filed with the Japan Patent Office on Sep. 14, 2018, the entire contents of which are incorporated herein by reference.

It should be understood by those skilled in the art that various modifications, combinations, sub-combinations, and alterations may occur depending on design requirements and other factors insofar as they are within the scope of the appended claims or the equivalents thereof

The invention claimed is:

1. A drawing system comprising:
a storage that stores a conversion table that describes a correspondence relationship between gradation values in a leuco color space and output setting values of light sources;
a generator that generates, on a basis of leuco image data described in the leuco color space and the conversion table, the output setting values corresponding to the leuco image data; and
a drawing section that performs drawing on a recording medium on a basis of the output setting values generated by the generator, the recording medium including a plurality of recording layers, the plurality of recording layers each including a leuco dye and a photothermal conversion agent, wherein
the storage further stores a conversion profile that describes a relationship between a device-dependent color space and a device-independent color space, and that describes a relationship between the device-independent color space and the leuco color space, and
the drawing system further includes a converter that converts image data described in the device-dependent color space into the leuco image data described in the leuco color space.

2. The drawing system according to claim 1, wherein
the storage further stores an exclusion condition list that describes the output setting values that are in a range in which an erasing defect or a medium deterioration defect may occur in drawing on the recording medium performed by the drawing section, the drawing system further includes a creation section that creates an output setting file by replacing the output setting values that match the exclusion condition list, out of a plurality of sets of the output setting values generated by the generator, with the output setting values that are in the range in which the erasing defect or the medium deterioration defect may occur, and the drawing section performs drawing on the recording medium on a basis of the output setting file created by the creation section.

3. The drawing system according to claim 1, wherein the drawing section includes a light source section that outputs a laser light beam having power corresponding to the output setting values.

4. The drawing system according to claim 1, wherein the conversion profile is provided for each type of recording medium on which drawing is to be performed.

5. The drawing system according to claim 1, wherein the device-dependent color space is an RGB color space, and the device-independent color space is an L*a*b* color space or an XYZ color space.

6. A method of creating a conversion profile, the method comprising:

storing a conversion table that describes a correspondence relationship between gradation values in a leuco color space and output setting values of light sources;

storing a conversion profile that describes a relationship between a device-dependent color space and a device-independent color space, and that describes a relationship between the device-independent color space and the leuco color space;

generating, on a basis of leuco image data described in the leuco color space and the conversion table, the output setting values corresponding to the leuco image data;

converting image data described in the device-dependent color space into the leuco image data described in the leuco color space; and drawing on a recording medium on a basis of the output setting values generated by the generator, the recording medium including a plurality of recording layers, the plurality of recording layers each including a leuco dye and a photothermal conversion agent.

7. The method of creating the conversion profile according to claim 6, further comprising:

generating a color list on a basis of the conversion table that describes the correspondence relationship between gradation values in the leuco color space and the output setting values of the light sources, the color list describing a correspondence relationship between combinations of the gradation values of respective colors in the leuco color space and the output setting values corresponding to the combinations; and generating a conversion profile that describes a correspondence relationship between values in a device-independent color space and the gradation values in the leuco color space included in the color list, the values in the device-independent color space being obtained by performing color measurement on the recording medium on which drawing has been performed on a basis of the color list.

8. The method of creating the conversion profile according to claim 7, further comprising generating the conversion table, wherein the forming the conversion table includes creating the conversion table by excluding, from the output setting values, the output setting values that are in a range in which a defect occurs, the defect being that the recording medium develops a color which is different from a color to be developed.

* * * * *